United States Patent
Terazono

(10) Patent No.: US 8,117,466 B2
(45) Date of Patent: Feb. 14, 2012

(54) DATA PROCESSING DEVICE AND POWER SUPPLY VOLTAGE GENERATOR THAT CONTROL A POWER SUPPLY VOLTAGE DURING AN AUXILIARY PERIOD, AND METHOD OF CONTROLLING THE POWER SUPPLY VOLTAGE THEREOF DURING AN AUXILIARY PERIOD

(75) Inventor: Nobuhiro Terazono, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 668 days.

(21) Appl. No.: 12/199,183

(22) Filed: Aug. 27, 2008

(65) Prior Publication Data
US 2009/0063875 A1 Mar. 5, 2009

(30) Foreign Application Priority Data
Aug. 28, 2007 (JP) ................................ 2007-220757

(51) Int. Cl.
*G06F 1/00* (2006.01)
(52) U.S. Cl. ....................................................... 713/300
(58) Field of Classification Search ............ 713/500–600
See application file for complete search history.

(56) References Cited

U.S. PATENT DOCUMENTS

| | | | |
|---|---|---|---|
| 6,252,384 B1 | 6/2001 | Arai et al. | |
| 6,889,336 B2* | 5/2005 | Schoenfeld et al. | 713/503 |
| 7,532,059 B2* | 5/2009 | Naritake | 327/534 |
| 7,805,628 B2* | 9/2010 | Kushnick | 713/501 |
| 2005/0258313 A1* | 11/2005 | Yerge et al. | 246/34 CT |
| 2005/0286184 A1* | 12/2005 | Campolo | 361/42 |

FOREIGN PATENT DOCUMENTS

| | | | |
|---|---|---|---|
| JP | 07-160372 A | | 6/1995 |
| JP | 2000-305668 A | * | 11/2000 |
| JP | 2000305668 A | | 11/2000 |
| JP | 2003-330555 A | | 11/2003 |
| JP | 2004-135314 A | | 4/2004 |
| JP | 2006285539 A | | 10/2006 |

* cited by examiner

*Primary Examiner* — Mohammed Rehman
(74) *Attorney, Agent, or Firm* — Sughrue Mion, PLLC

(57) ABSTRACT

A data processing device including a power supply terminal having a first power supply voltage applied thereto; a regulator that generates a second power supply voltage based on the first power supply voltage; an internal circuit having an operation clock, wherein the second power supply voltage is supplied to the internal circuit through a power supply; and a power supply voltage variation suppressor connected between the power supply terminal and the power supply line. In this device, the power supply voltage variation suppressor sets an auxiliary period and supplies auxiliary current to the power supply line during the auxiliary period, and wherein the auxiliary period is synchronized with the operation clock of the internal circuit.

24 Claims, 17 Drawing Sheets

DATA PROCESSING DEVICE AND POWER SUPPLY VOLTAGE GENERATOR THAT CONTROL A POWER SUPPLY VOLTAGE DURING AN AUXILIARY PERIOD, AND METHOD OF CONTROLLING THE POWER SUPPLY VOLTAGE THEREOF DURING AN AUXILIARY PERIOD

BACKGROUND OF THE INVENTION

1. Field of the Invention

The present invention relates to a data processing device, a power supply voltage generator and method of controlling power supply voltage and more particularly, relates to a data processing device which has a regulator circuit, a supply voltage generator and method of controlling power supply voltage.

2. Description of Related Art

In recent years, semiconductors used in a mobile and other devices, saw an increased demand for a reduction in electrical power usage and a reduction in size. In the semiconductor device, the demands of the electrical power saving and the reduction in size also include the miniaturization of the production process. However, a power supply voltage in a system which includes a semiconductor device is 3V or 5V. Therefore, in the case where this type of power supply is used, it is difficult to save electrical power. One way to save electrical power in this type of system is by generating an internal voltage, which is lower than the power supply voltage used by the system, and using a regulator, or a similar device, and operating the internal circuit of the system by using the internal voltage.

However, output voltage of the regulator may change depending on an increase and decrease of consumption current (hereinafter referred to as "load current") of the internal circuit. In the case where the output voltage of the regulator changes and the internal voltage becomes lower than the power supply voltage at which the internal circuit can function, there is a possibility that the internal circuit can malfunction. Therefore, in order to control the variation of the output voltage of the regulator, a capacitor for stability of the voltage, may be connected to the output of the regulator. Although a capacitance value of the capacitor is dependant on the fluctuating range of the load current, the capacitance value commonly becomes so large that the capacitor cannot be included in the semiconductor device. Because of this, the semiconductor device which is mounted in the regulator requires an additional terminal for connecting the capacitor and therefore other necessary terminals may not be created.

A related art power supply voltage variation suppressor, which suppresses a voltage variation by a load current change without depending on a capacitor for stability of the voltage, is disclosed in Japanese Unexamined Patent Application Publication No. 2000-305668 (Arai et al.). The power supply voltage variation suppressor disclosed in Arai et al. is shown in FIG. 14. In FIG. 14, CPU 109 switches from an operation state to a resting state based on a signal level of a stop clock signal which is input from a stop clock terminal 191. A load current Ic which is consumed by CPU 109 in the operating state is larger than in the resting state. A control circuit 120 controls a current value of current It which flows in a transistor 106 based on a current value control signal input to a current value control terminal 121. The control circuit 120 controls rate of change of transistor current It based on a time constant control signal input at the time constant control terminal 122.

FIG. 15 is a timing chart showing an operation of the power supply voltage variation suppressor 100. As shown in FIG. 15, CPU 109 is in the resting state when a stop clock signal level is low and is in the operating state when the stop clock signal level is high. Further, the current control signal level becomes low before and after the period during which the stop clock signal level is high (See, e.g., time t1-t4 and time t7 to t9). Furthermore, the time constant control signal includes a period in which the stop clock signal level is high and stays high longer than the period during which the stop clock signal level is high (time t3-t8). With respect to the transistor current It this current flows in the transistor 106 and increases gradually before the CPU current Ic consumed in CPU 109 increases, and decreases so as to counteract an increase of the CPU current Ic by controlling the stop clock signal, the current control signal and the time constant control signal as described above. Further the transistor current It also increases so as to counteract a decrease of the CPU current Ic, and may then gradually decrease.

In other words, the power voltage variation suppressor 100 prevents a rapid change in current flowing through CPU 109 from a power supply line 102 by using the transistor current It and also suppresses voltage variation of the power supply line 102. FIG. 16 shows a voltage waveform of a CPU terminal (a waveform of the power supply line 102) in the power voltage variation suppressor 100. As illustrated in FIG. 16, in the case where a power voltage variation suppressor 100 is not included, an overshoot and an undershoot occur in the voltage waveform depending on the switching of the operation state and the resting state, and a variation range of the power supply voltage increases. Conversely, where the power voltage variation suppressor 100 is included, it is possible to suppress a variation range of the power supply voltage to about half of the case where the power voltage variation suppressor (100) is not used.

Another related art Application, Japanese Unexamined Patent Application Publication No. 2006-285539 (Tadao Oshima) discloses a portable information reading device. The portable information reading device supplies additional load power, which a device needs, by using a second battery in addition to the first battery in the case where the load power of the device exceeds the available load power of the first battery.

The relationship between CPU current Ic and transistor current It in the power voltage variation suppressor 100 is shown in FIG. 17. As shown in FIG. 17, the power voltage variation suppressor 100 needs the transistor current It as well as the CPU current Ic. That is, the power voltage variation suppressor 100 disclosed in Arai et al. consumes transistor current It and leads to an increase in power consumption, which is a problem. The problem of increased power consumption is more notable in a system where the operating state and the resting state of the CPU 109 are switched frequently.

SUMMARY

One aspect of the present invention is a data processing device comprising a power supply terminal to which a first power supply voltage is input, a regulator to generate a second power supply voltage based on the first power supply voltage, wherein the second power supply voltage is supplied through a power supply line to an internal circuit, and a power supply voltage variation suppressor connected between the power supply terminal and the power supply line. The power supply voltage variation suppressor sets an auxiliary period and supplies an auxiliary current to the power supply line during the auxiliary period, wherein the auxiliary period is synchronized with an operation clock of the internal circuit.

Another aspect of the present invention is a data processing device comprising a power supply terminal to which a first power supply voltage is input, a regulator to generate a second power voltage based on the first power voltage, wherein, the second power supply voltage is supplied to an internal circuit through a power supply line, and the power supply voltage variation suppressor connected between the power supply terminal and the power supply line. The power supply voltage variation suppressor sets an auxiliary period synchronized with an operation clock of the internal circuit and connects the power supply terminal to the power supply line during the auxiliary period.

Another aspect of the present invention involves a power supply voltage generator for generating a second power supply voltage, which is then supplied to an internal circuit based on a first power supply voltage, further comprising a power supply terminal to which the first power supply voltage is input, a regulator to generate the second power supply voltage based on the first power supply voltage, a power supply line to supply the second power supply voltage to an internal circuit, and a power supply voltage variation suppressor connected between the power supply terminal and the power supply line. The power supply voltage variation suppressor sets an auxiliary period synchronized with an operation clock of the internal circuit and supplies an auxiliary current to the power supply line during the auxiliary period.

Another aspect of the present invention is directed to a method for generating power supply voltage, comprising generating a second power supply voltage based on a first power supply voltage, supplying the second power supply voltage to an internal circuit through a power supply line, setting an auxiliary period synchronized with an operation clock of the internal circuit and supplying an auxiliary current to the power supply line during the auxiliary period.

A data processing device, a power supply voltage generator and a method for generating power supply voltage according to aspects of the present invention set an auxiliary period corresponding to a load current of an internal circuit that is synchronized with an operation clock and supply an auxiliary current to a power supply line during the auxiliary period. That is, aspects of the present invention may compensate the increased load current in the power supply line using the auxiliary current during periods when the response speed of a regulator can't follow the change of the load current of the internal circuit, which changes depending on the operation of the internal circuit.

Therefore, as will be described in more detail below, the data processing device, the power supply voltage generator and the method for generating power supply voltage may suppress the voltage change of the second power supply voltage without increasing current consumption of the data processing device.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will now be described herein with reference to illustrative embodiments. Those skilled in the art will recognize that many alternative embodiments can be accomplished using the teachings of the present invention and that the invention is not limited to the embodiments illustrated for explanatory purposes.

Figure 1:
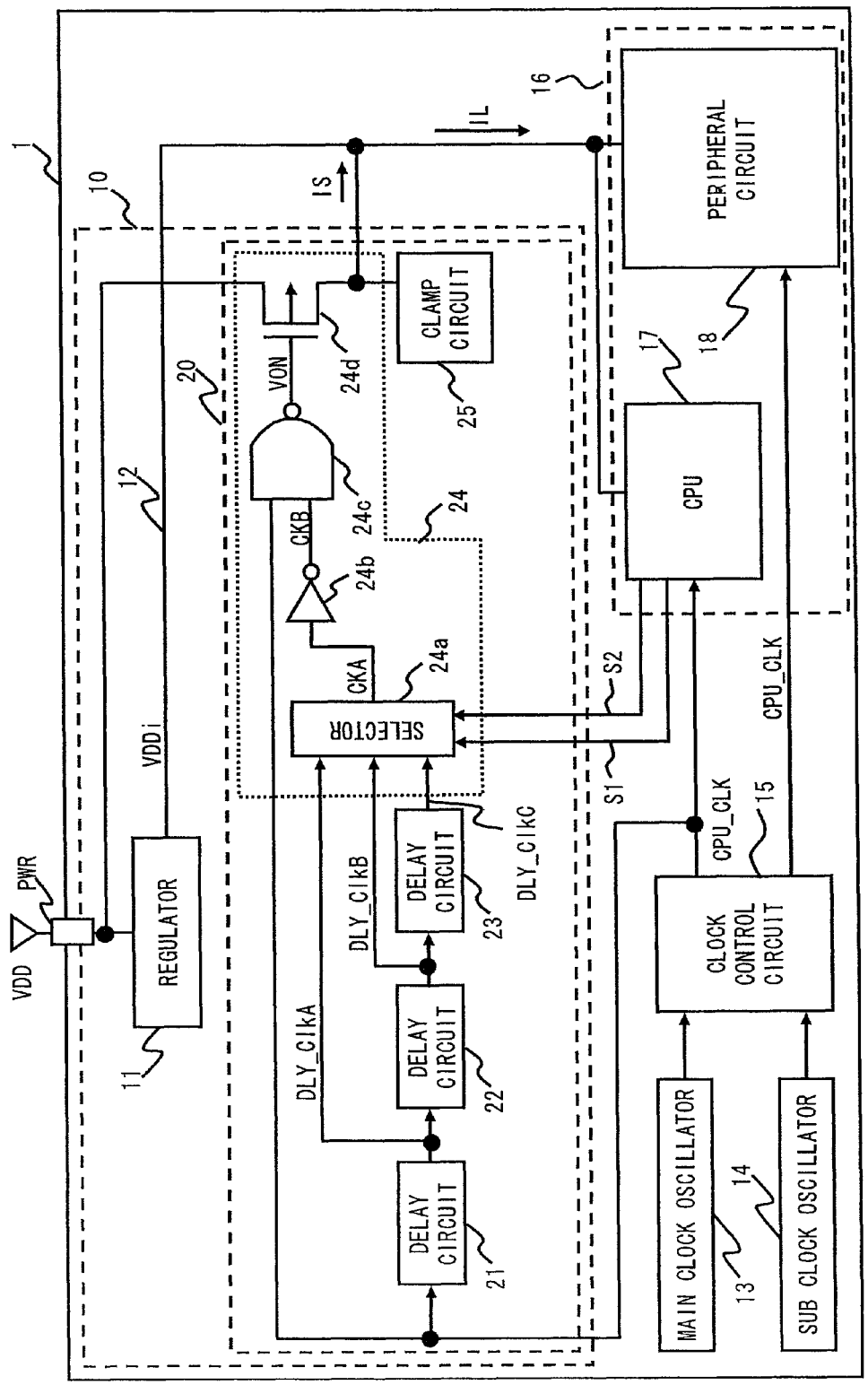
FIG. 1 is a block diagram of a date processing device according to an exemplary embodiment of the present invention.

FIG. 1 is a block diagram showing a data processing device 1 according to one exemplary embodiment. Note that, each block of the data processing device 1 can be formed on a same semiconductor substrate or can be formed on individual semiconductor devices. The data processing device 1 includes a power supply terminal PWR, a regulator 11, a power supply line 12, a main clock oscillator 13, a sub clock oscillator 14, an internal circuit 16 and a power supply voltage variation suppressor 20. Note that, in the data processing device 1, the regulator 11 and the power supply voltage variation suppressor 20 constitute a power supply voltage generator 10.

Figure 2:
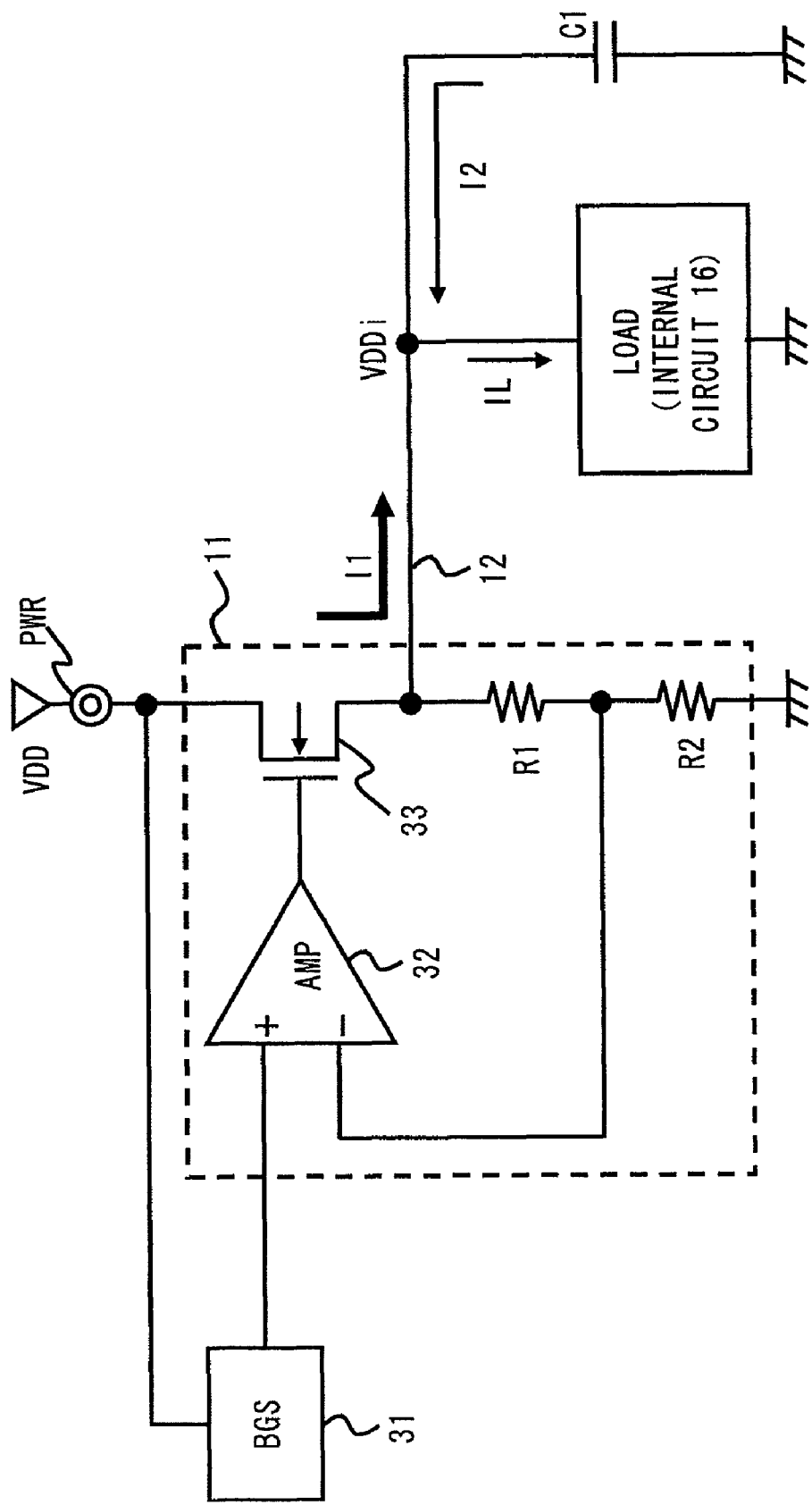
FIG. 2 is a circuit diagram of a regulator according to an exemplary embodiment of the present invention.

The power supply terminal PWR is an input terminal of a first power supply VDD, which is external. The regulator 11 generates a second power supply voltage VDDi based on the first power supply voltage VDD. An example of a regulator 11 circuit will be shown in FIG. 2. As shown in FIG. 2, the regulator 11 includes an amplifier 32, an output transistor 33 and resistors R1, R2. An inverting input terminal of the amplifier 32 is connected to a resistance division point between resistor R1 and resistor R2, and non-inverting input terminal is connected to a band gap voltage source 31. The regulator 11 amplifies a voltage generated by the band gap voltage source 31 based on a resistance ratio of the resistors R1, R2 and outputs the voltage. This output voltage is output from source side terminal of the output transistor 33 and becomes the second power supply voltage VDDi. Note that, in one exemplary embodiment the voltage value of the second power supply voltage VDDi is smaller than that of the first power supply voltage VDD. The output of the regulator 11 may be connected to a load and a capacitor C1. The load may be, for example, an internal circuit 16. In one exemplary embodiment, as shown in FIG. 1, the internal circuit 16 includes a CPU (Central Processing Unit) 17 and a peripheral circuit 18. The capacitor C1 is a capacitor for stabilizing the power supply and has a capacitance value, to an extent that can be formed on a semiconductor substrate. Note that, in FIG. 1, the band gap voltage source 31 and the capacitor C1 is not shown in order to simplify the drawing.

Figure 3:
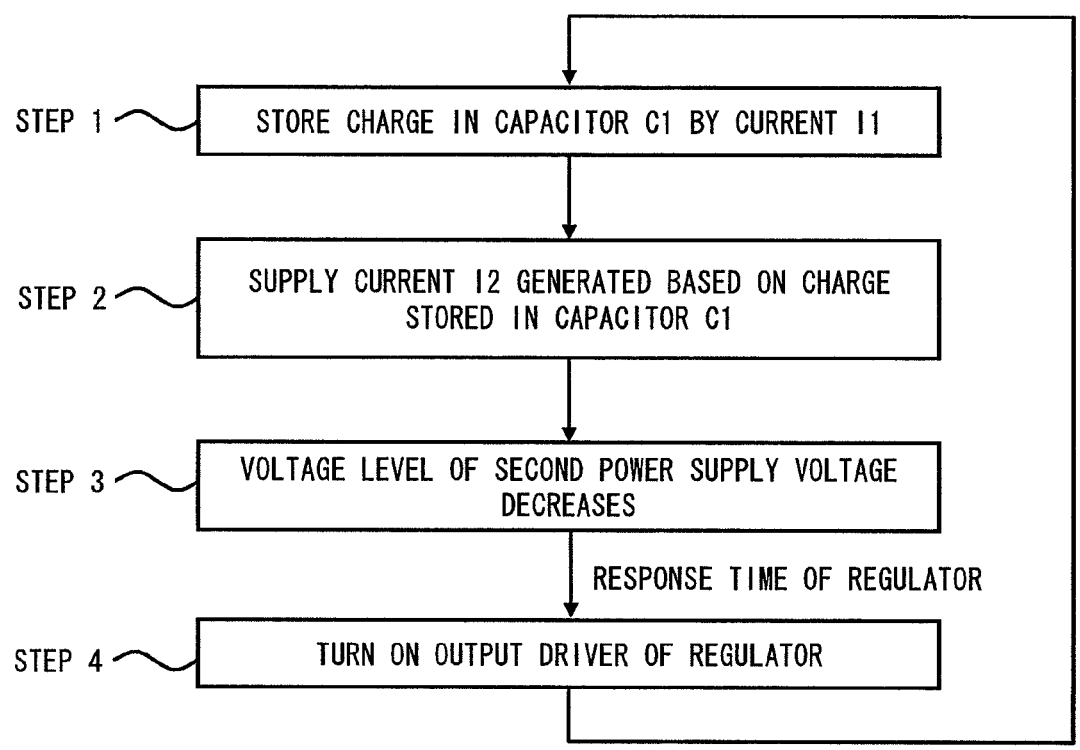
FIG. 3 is a flow chart showing an operating of the regulator according to one exemplary embodiment.

FIG. 3 is a flow chart showing one example of the operation of the regulator 11. As shown in FIG. 3, the regulator 11 stores charge to the capacitor C1 by using an output current I1 of the regulator 11 (Step 1). Next, the internal circuit 16 is supplied with current I2 which is generated based on the charge stored in the capacitor C1 (Step 2). When charge quantity stored in the capacitor C1 decreases in Step 2, the level of the second power supply voltage VDDi also decreases (Step 3). When the regulator 11 subsequently detects a decrease in the voltage level of the second power supply voltage VDDi, the regulator 11 places an output driver of the regulator 11 (the output transistor 33, for example) into a conductive state (ON state) (Step 4). That is, the regulator 11 suppresses the variation of the voltage level of the second power supply voltage VDDi. Here, the regulator 11 needs a predetermined response time from the detection of the voltage variation in Step 3 to making the output transistor 33 operate in Step 4. Therefore, the voltage value of the second power supply voltage VDDi decreases during the response time.

Figure 4:
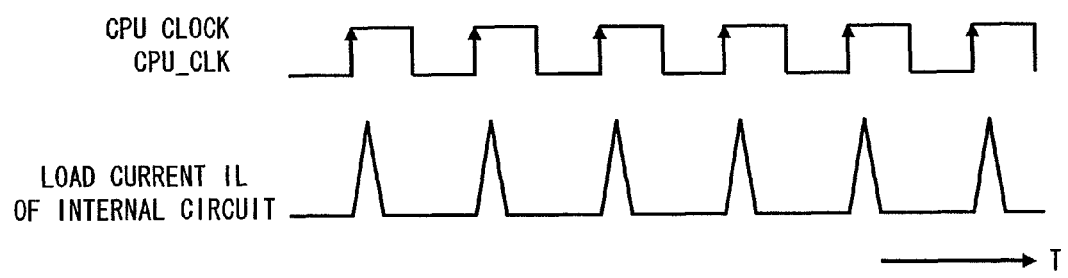
FIG. 4 is a view showing a relationship between an operating clock and a load current in the data processing device according to one exemplary embodiment.

The internal circuit 16 is a processing unit of the data processing device 1. In this embodiment, the internal circuit 16 includes the CPU 17 and the peripheral circuit 18. The CPU 17 and the peripheral circuit 18 use the second power supply voltage VDDi, which is supplied through the power supply line 12 as operational power supply voltage, and operate in synchronization with an operation clock CPU_CLK. An example of the relationship between the load current IL and the operation clock CPU_CLK is shown in FIG. 4. As shown in FIG. 4, when the internal circuit 16 operates in synchronization with a rising edge of the operation clock CPU_CLK, the load current IL increases in synchronization with the rising edge of the operation clock. Furthermore, the CPU 17 outputs an operation clock status signal S1 and a stop mode status signal S2 as operation mode information signals which indicate the mode of operation. The operation mode information signal can be output by the CPU as a result of processing and can be generated in response to a control signal (not shown) that can be externally input to the CPU 17. The operation mode will hereinafter be described in detail.

As shown in FIG. 1, the data processing device according to one exemplary embodiment includes a main clock oscillator 13, a sub clock oscillator 14 and a clock control circuit 15, generate and control the operation clock CPU_CLK which is input to the internal circuit 16. The main clock oscillator 13 and the sub clock oscillator 14 generate clock signals. At that time, the main clock oscillator 13 generates a signal of a frequency that is higher than the frequency of the clock signal generated by the sub clock oscillator 14.

The clock control circuit 15 selects one of the clocks which are generated by the main clock oscillator 13 and the sub clock oscillator 14 and outputs the selected clock as the operation clock CPU_CLK. The clock control circuit 15 can determine which clock to use based on a control signal from the CPU 17 or based on an external control signal.

In one exemplary embodiment, the power supply voltage variation suppressor 20 includes an auxiliary period corresponding to a period for which the load current IL of the internal circuit 16 increases in synchronization with the operation clock CPU_CLK. The power supply voltage variation suppressor 20 supplies auxiliary current IS to the power supply line 12 during the auxiliary period. In one exemplary embodiment, the auxiliary current IS is supplied to the power supply line 12 through the power supply voltage variation suppressor 20 from the power supply terminal PWR.

The power supply voltage variation suppressor 20 includes delay circuits 21-23, an auxiliary current supplier 24 and a clamp circuit 25. The delay circuits 21-23 are connected in series, and delay circuit 21, connected in a first stage, includes an input from the operation clock CPU_CLK. Delay circuits 21-23 output delay clocks DLY_ClkA-DLY ClkC which have a different phase, respectively. The auxiliary current supplier 24 selects one of the delay clocks DLY_ClkA-DLY ClkC based on the operation mode information signal, and sets the auxiliary period based on the delay time of the selected delay clock and the operation clock CPU_CLK. Then, the auxiliary current supplier 24 outputs the auxiliary current IS during the auxiliary period.

In one exemplary embodiment, auxiliary current supplier 24 includes a selector 24a, an inverter 24b, a gate circuit (NAND circuit, for example) 24c and a switch transistor 24d. The selector 24a selects one of the delay clocks DLY_ClkA-DLY ClkC based on operation clock status signal S1 and operation clock status signal S2 and outputs the selected delay signal as a clock signal CKA. The inverter 24b inverts the clock signal CKA and outputs it as a clock signal CKB. The NAND circuit 24c outputs an inverted AND of the operation clock CPU_CLK and clock CKB as a switch control signal VON. The switch transistor 24d may be formed as a PMOS transistor, for example. In this exemplary embodiment, the switch transistor 24d is in a conductive state when the switch control signal VON level is low, and in a non-conductive state when the switch control signal VON level is high. The source of the switch transistor 24d is connected to the power supply terminal PWR, the drain is connected to the power supply line 12 and the gate is connected to the output of the NAND circuit 24c.

The clamp circuit 25 is connected to a connection node between an output of the auxiliary current supplier 24 and the power supply line 12. In one exemplary embodiment, the clamp circuit 25 suppresses the voltage level of the connection node unless the voltage level of the power supply line 12 (the second power supply voltage VDDi, for example) exceeds the prescribed voltage.

Here, an operation mode of the internal circuit 16 in one exemplary embodiment will be described. The internal circuit 16 of this exemplary embodiment has a main RUN mode, a stop mode, sub RUN node and sub HALT mode as operation modes. The main RUN mode is a mode in which both the CPU 17 and the peripheral circuit 18 operate based on an operation clock generated by the main clock oscillator 13 (hereinafter referred to as "main clock"). The load current IL of the internal circuit 16 in the main RUN mode in one exemplary embodiment is approximately 3 mA. The stop mode is a mode in which both the CPU 17 and the peripheral circuit 18 are stopped. The load current IL of the internal circuit 16 in the stop mode in this exemplary embodiment is approximately 1 µA. The sub RUN mode is a mode in which both the CPU 17 and the peripheral circuit 18 operate based on an operation clock generated by the sub clock oscillator 14 (hereinafter referred to as "sub clock"). The load current IL of the internal circuit 16 in the sub RUN mode in this exemplary embodiment is approximately 10 μA. The sub HALT mode is a mode in which the CPU 17 as stopped and the peripheral circuit 18 operates based on the sub clock. The load current IL of the internal circuit 16 in the sub HALT mode in this exemplary embodiment is approximately 3 μA.

Figure 5:
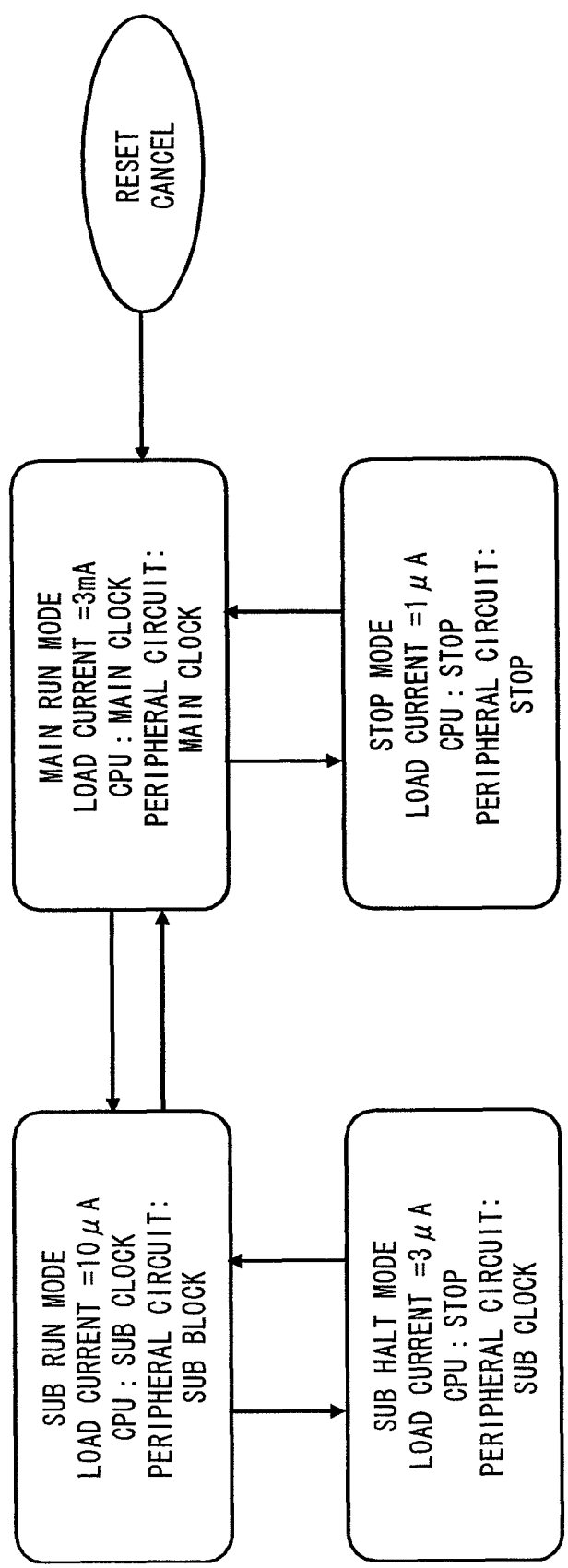
FIG. 5 is a state transition diagram showing a mode transition of an internal circuit in the data processing device according to one exemplary embodiment.

FIG. 5 shows a state transition diagram of the operation modes of the internal circuit 16 in accordance with one exemplary embodiment. As shown in FIG. 5, when a reset cancel is performed and the internal circuit 16 switches to the operable state, the internal circuit 16 begins to operate in the main RUN mode. The internal circuit 16 can change to the sub RUN mode or to the stop mode from the main RUN mode. Further the transition to the sub HALT mode can be performed from the main RUN mode through the sub RUN mode.

Figure 6:
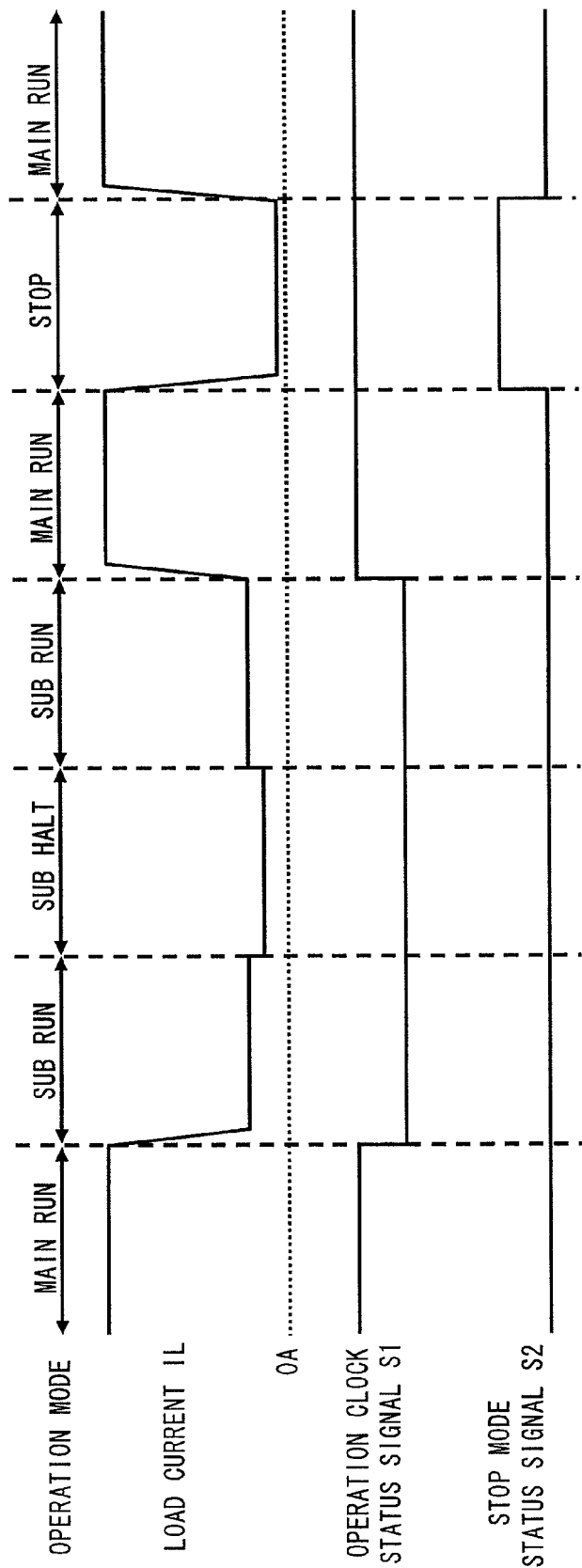
FIG. 6 is a timing chart showing a mode transition of an internal circuit in the data processing device according to an exemplary embodiment.

One example of a timing chart of the load current IL and the operation mode information signal in each operation mode, in the case where the state of the internal circuit 16 is changed, is shown in FIG. 6. In the example shown in FIG. 6, the operation modes change in order of the main RUN mode, sub RUN, sub HALT mode, the sub RUN mode, the main RUN mode, the stop mode and the main RUN mode. At that time, the load current IL increases in the main RUN mode, and decreases in order of the sub RUN mode, the sub HALT mode and the stop mode. The sub RUN mode, the sub HALT mode and the stop mode have a difference in the load current IL, but the difference is smaller than the difference between the main RUN mode and the sub RUN mode. The level of the operation clock status signal S1 becomes low in the sub RUN mode and the sub HALT mode, in which the internal circuit 16 operates using the sub clock, and becomes high in the main RUN mode in which the internal circuit 16 operates using the main clock and in the stop mode in which the clock is stopped. The level of the operation clock status signal S2 becomes high only in the stop mode.

Figure 7:
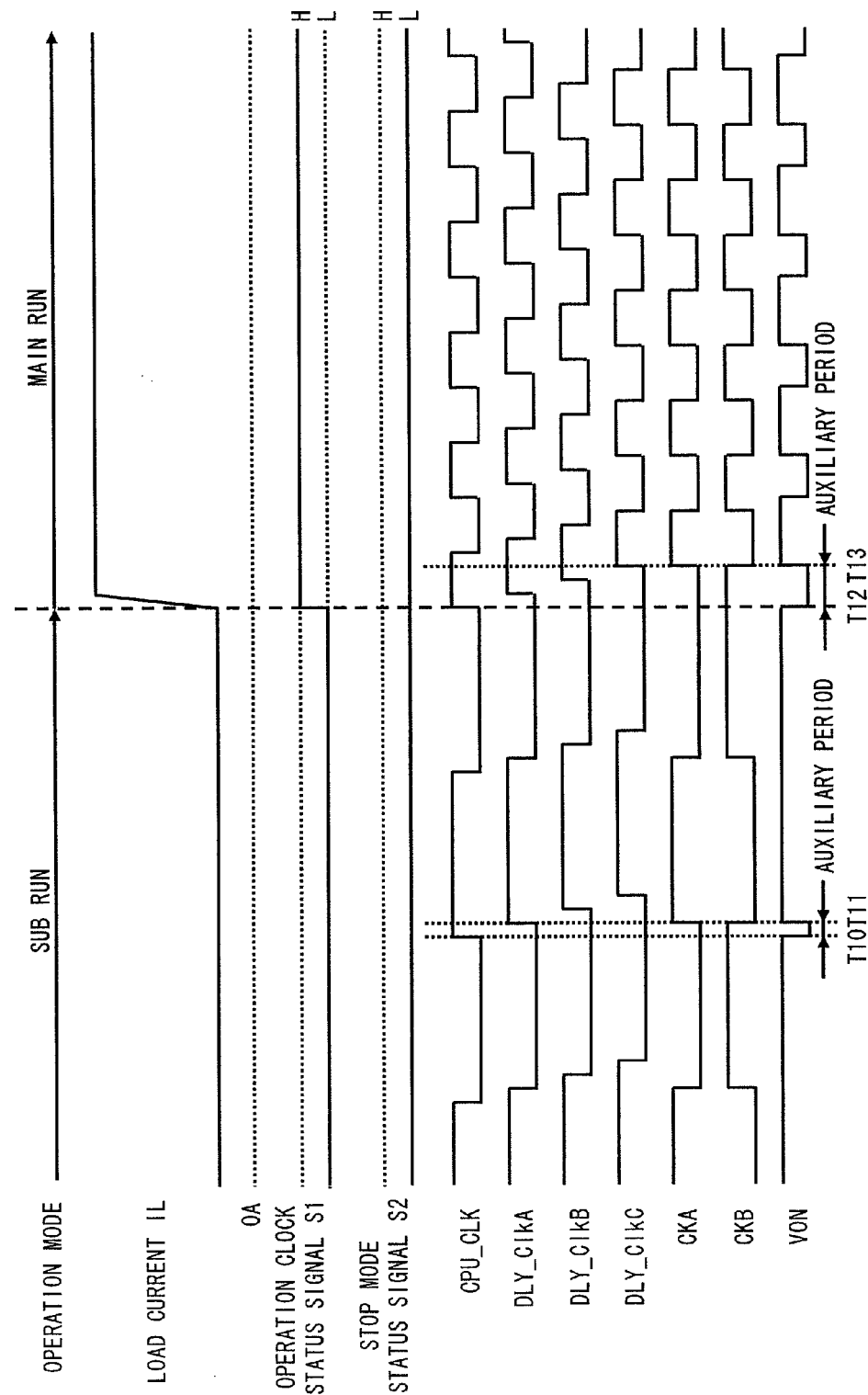
FIG. 7 is a timing chart showing an operation of the data processing device according to an exemplary embodiment.

Next, the operation of the power supply voltage variation suppressor 20 in accordance with one exemplary embodiment will be explained. In this exemplary embodiment, as shown in FIG. 6, magnitude of the load current IL changes depending on the operation mode of the internal circuit 16. Therefore, the power supply voltage variation suppressor 20 changes the length of the auxiliary period depending on the operation mode of the internal circuit 16. FIG. 7 shows a timing chart of the data processing device 1 operation according to one exemplary embodiment, which is in the sub RUN mode and the main RUN mode. As shown in FIG. 7, the internal circuit 16 operates based on a low-speed operation clock CPU_CLK in the sub RUN mode, and operates based on a high-speed operation clock CPU_CLK in the main RUN mode. The load current IL in the main RUN mode becomes larger than that in the sub RUN mode. The level of the operation clock status signal S1 becomes low in the sub RUN mode, and becomes high in the main RUN mode. The level of the operation clock status signal S2 is low in both the sub RUN mode and the main RUN mode.

The power supply voltage variation suppressor 20 adjusts the length of the auxiliary period depending on the difference of the load current IL of the internal circuit 16 caused by the difference of the operation modes. One example of operation of the power supply voltage variation suppressor 20 will be explained with reference to the timing chart of FIG. 7. In the sub RUN mode, as the load current IL is small, the auxiliary period is set short. The power supply voltage variation suppressor 20 generates multiphase delay clocks DLY_ClkA-DLY_ClkC which are delayed with respect to the operation clock. In the sub RUN mode, both of the level of the operation clock status signal S1 and the operation clock status signal S2 are low. The selector 24a selects the delayed signal which has the smallest delay time among delay clocks DLY_ClkA-DLY_ClkC. Then, selector 24a outputs the delay signal selected as a clock signal CKA.

The clock signal is inverted by the inverter 24b and becomes a clock signal CKB. Next, NAND circuit 24c outputs a not AND of the clock signal CKB and the operation clock CPU_CLK as a switch control signal VON. This makes the switch control signal VON become a pulse signal which has a falling edge in synchronization with a rising edge of the operation clock CPU_CLK (timing T10-T11 of FIG. 7). The low level width of this pulse signal corresponds to the delay time set by the delay circuit 21, and the low level width of the pulse signal becomes the auxiliary period. The auxiliary current supplier 24 places the switch transistor 24d in the conductive state depending on the signal level of the switch control signal VON during the auxiliary period in which the level of the switch control signal VON becomes low. This makes the power supply voltage variation suppressor 20 output an auxiliary IS from the power supply terminal PWR to the power supply line 12 during the auxiliary period. Note that, in one exemplary embodiment, the logical level of the operation clock status signal S1 and the operation clock status signal S2 in the sub HALT mode is same as that in the sub RUN mode, as such, in this embodiment, the operation of the power supply voltage variation suppressor 20 in the sub HALT mode is same as that in the sub RUN mode.

In main RUN mode, since the load current IL is large, the auxiliary period is set to be longer. In main RUN mode, the level of the operation clock status signal S1 becomes high and the level of the operation clock status signal S2 stays low. The selector 24a selects the delay signal which has the largest delay time among the delay signal DLY_ClkA-DLY ClkC. Then, the selector 24a outputs the delay signal selected as a clock signal CKA.

The clock signal CKA is inverted by the inverter 24b and becomes clock signal CKB. Then, NAND circuit 24c outputs a not AND of the clock signal CKB and the operation clock CPU_CLK as a switch control signal VON. This makes the switch control signal VON become a pulse signal which has a falling edge in synchronization with a rising edge of the operation clock CPU_CLK (timing T12-T13 of FIG. 7). The low level width of this pulse signal corresponds to the delay time set by three delay circuits 21-23, and the low level width of the pulse signal becomes the auxiliary period. The auxiliary current supplier 24 places the switch transistor 24d in the conductive state depending on the signal level of the switch control signal VON during the auxiliary period, in which the level of the switch control signal VON becomes low. This makes the power supply voltage variation suppressor 20 output an auxiliary IS from the power supply terminal PWR to the power supply line 12 during the auxiliary period.

Figure 8:
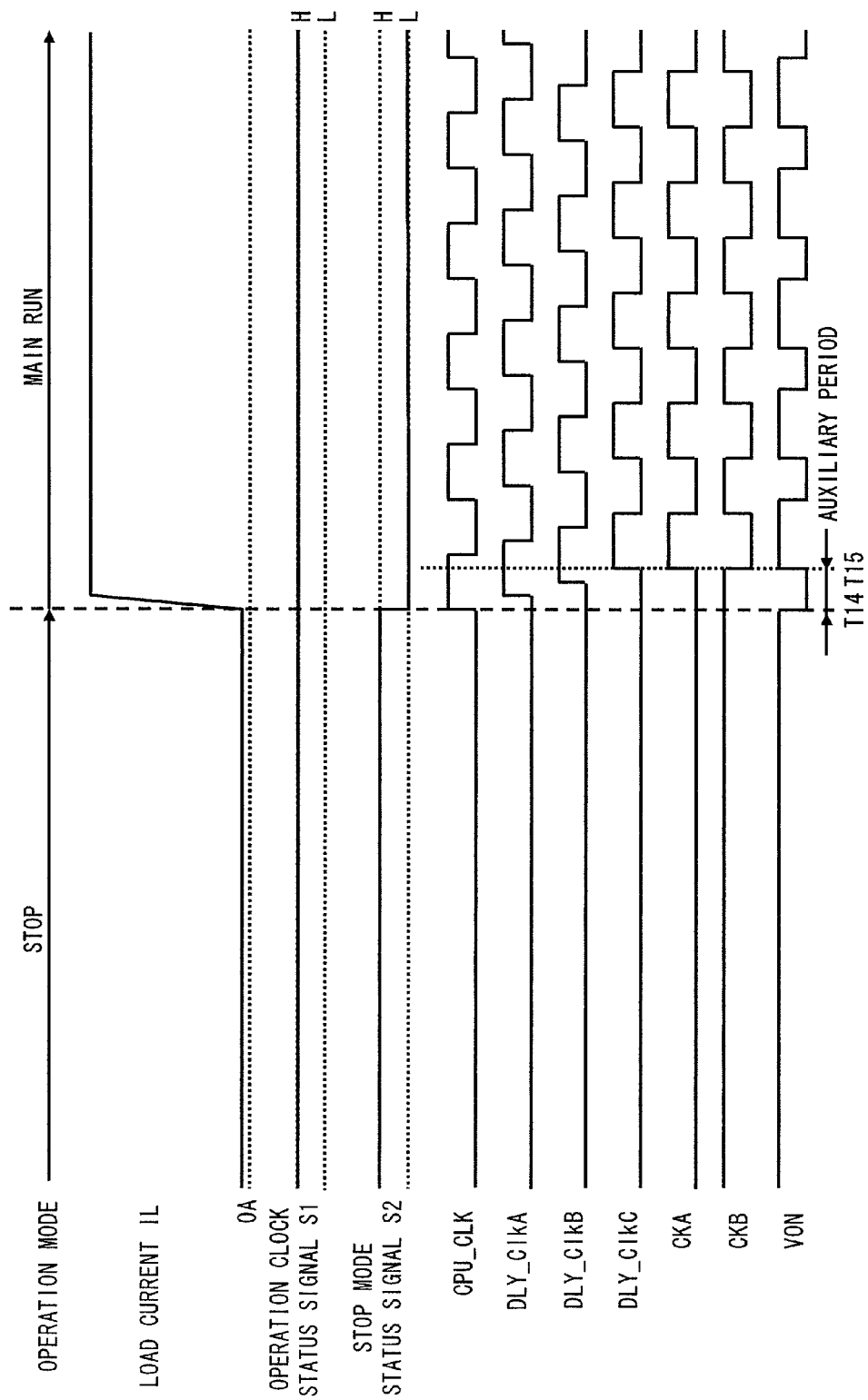
FIG. 8 is also a timing chart showing an operation of the data processing device according to one exemplary embodiment.

FIG. 8 is a timing chart showing one example of the operation of the data processing device 1 in the stop mode and the main RUN mode. Note that, as the operation of the power supply voltage variation suppressor 20 in the main RUN mode is same as the example shown in FIG. 7, the detail of explanation will be omitted. As shown in FIG. 8, the operation clock CPU_CLK of the internal circuit 16 stops in the stop mode and the internal circuit 16 operates based on the high-speed operation clock CPU_CLK in the main RUN mode. The load current IL in the main RUN mode is larger than that in the stop mode. The level of the operation clock status signal S1 and the operation clock status signal S2 is high during the stop mode.

An example of operation of the power supply voltage variation suppressor 20 will be described with reference to the timing chart of FIG. 8. In the stop mode, since the operation clock CPU_CLK stops, the level of the switch control signal VON remains high. Therefore, the power supply voltage variation suppressor 20 never outputs the auxiliary current IS during the stop mode.

Here, in the case where the stop mode is changed to the main RUN mode, the voltage variation of the second power supply voltage VDDi will be explained. Note that, since the difference between the load current IL in the sub RUN mode and the main RUN mode and the difference between the load current IL between the stop mode and in the main RUN mode are similar, the voltage variation of the second power supply voltage VDDi in a mode change from the sub RUN mode to the main RUN mode is virtually identical to the example shown in FIG. 9. On the other hand, since the fluctuation of the load current IL in a mode change from the sub HALT mode to the sub RUN mode is much smaller than that in mode change from the stop mode to the main RUN mode, the variation of the second power supply voltage VDDi during the change from the sub HALT mode to the sub RUN mode hardly occurs.

Figure 9:
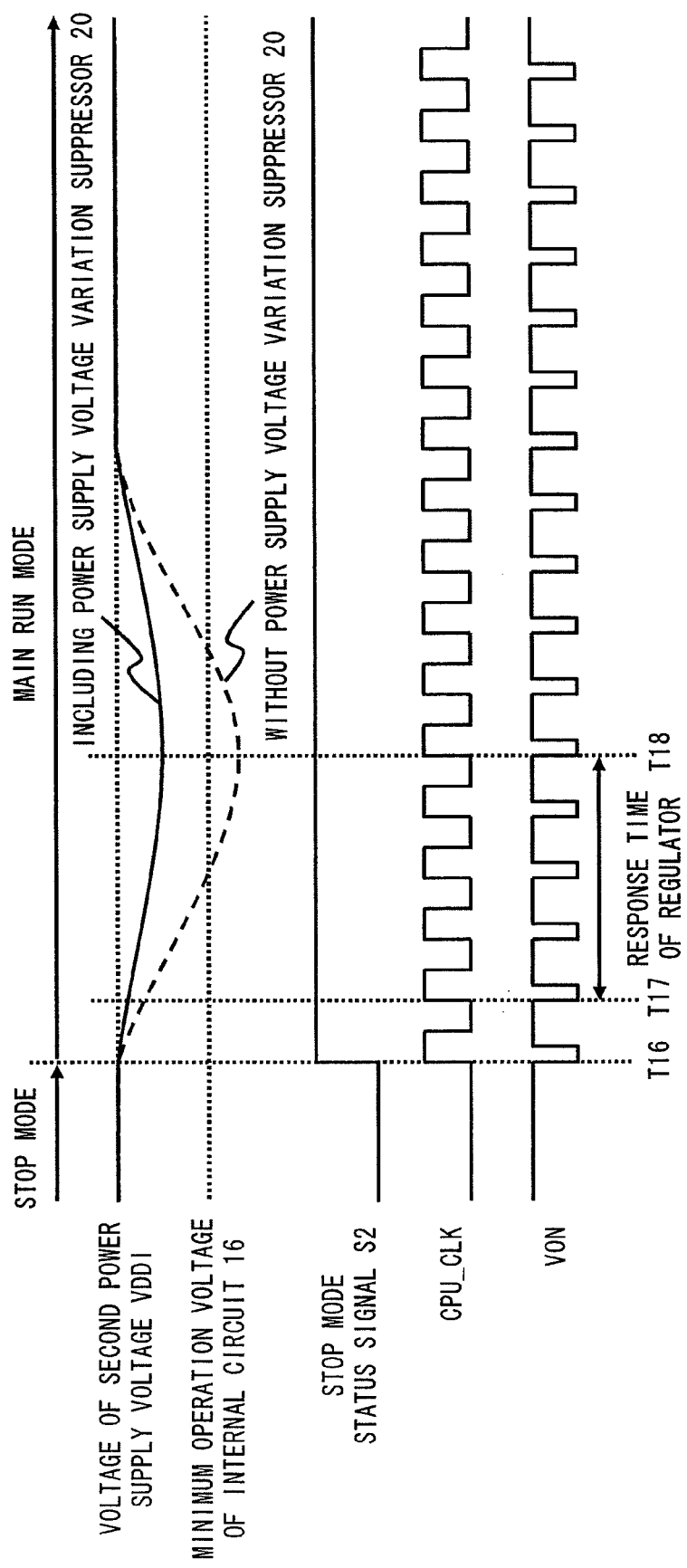
FIG. 9 is a timing chart showing a voltage variation of a second power supply in the data processing device according to an exemplary embodiment.

The stop mode of the regulator 11 is a state during which the power supply is restrained. On the other hand, in the main RUN mode, the regulator 11 is in a state during which the regulator 11 can supply a current that is much larger than that in the stop mode. However, the regulator 11 needs a prescribed response time to increase current capability, after detecting a voltage drop of the second power supply voltage VDDi. Therefore, the load current IL of the power supply line 12 is supplied with a charge stored in the capacitor C1 shown in FIG. 2 until the response time of the regulator 11 is passed from a mode change point. This causes a voltage drop of the second power supply voltage VDDi as shown in FIG. 9 at the mode change point (timing T16-T18).

In the case where the power supply voltage variation suppressor 20 is not included, when the mode is changed the load current IL is only covered the charge stored in the capacitor C1, as such, the voltage variation of the second power supply voltage VDDi becomes large. In this case, the voltage of the second power supply voltage VDDi falls below the minimum operation power supply voltage of the internal circuit 16 and there is a possibility that the internal circuit 16 can malfunction. On the other hand, in the case where the power supply voltage variation suppressor 20 is included, the power supply voltage variation suppressor 20 outputs the auxiliary current IS in synchronization with the rising edge of the operation clock CPU_CLK at which the load current increases. Therefore, even if within the response time of the regulator 11 after the mode change, the load current IL is covered by auxiliary current IS output by the capacitor C1 and the power supply voltage variation suppressor 20. That is, during the period which the voltage of the second power supply voltage VDDi decreases after the mode change, the consumption of the charge stored in the capacitor C1 can be suppressed. As shown, when the power supply voltage variation suppressor 20 is included, the voltage drop of the second power supply voltage VDDi can be suppressed.

As described above, in one exemplary embodiment of the data processing device 1, the power supply voltage variation suppressor 20 outputs an auxiliary current IS to the power supply line 12 in sync with the rising timing of the operation clock CPU_CLK during a period when the load current IL of the internal circuit 16 increases. This auxiliary current IS is supplied to the power supply line 12 supplementary depending on the increasing of the load current, and covers the current output from the capacitor C1. That is, the auxiliary current IS output by the power supply voltage variation suppressor 20 does not increase the current consumption of the data processing device 1. Further, the auxiliary current IS is supplied as necessary, to the power supply line 12 which can reduce the variation of the second power supply voltage VDDi against the current consumption variances as a result of the operation clock of the data processing device 1. Therefore, increase of the consumption current can be suppressed in this exemplary embodiment of the data processing device 1.

Furthermore, as described above, the power supply voltage variation suppressor 20 adjusts the auxiliary period to correspond to the period during which the load current of the internal circuit 16 increases and outputs the auxiliary current IS only during the auxiliary period. This suppresses the consumption of the charge stored in the capacitor C1 and can suppress voltage variation of the second power supply voltage VDDi. That is, in one exemplary embodiment, the data processing device 1 can suppress the voltage variation of the second power supply voltage VDDi without increasing the current consumption of the data processing device 1.

The charge stored in the capacitor C1 connected to the regulator 11 is used by the load current IL of the internal circuit 16 during a period starting from the regulator 11 detecting the voltage drop of the power supply line 12, caused by the load current IL in the internal circuit 16, until the output driver is turned on. Here, in the case where the power supply voltage variation suppressor 20 is not included, the capacitor C1 needs a large capacity so as to respond to a large load current IL, such as, for example, in the main RUN mode. However, in one exemplary embodiment, the consumption of the charge stored in the capacitor C1 is suppressed by supplying the load current to the power supply line 12 during the period when the load current IL decreases. Therefore the data processing device 1, which includes the power supply voltage variation suppressor 20 of this exemplary embodiment, can reduce the capacitance value of the capacitor C1. By reducing the capacitance value of the capacitor C1, it is possible for the capacitor C1 to be included on the semiconductor substrate. That is, as it is not necessary to connect to a capacitor outside the data processing device 1, the data processing device 1 does not require the extra terminal in order to connect to the capacitor C1.

Furthermore, in one exemplary embodiment, the power supply voltage variation suppressor 20 includes a clamp circuit 25. The clamp circuit 25 prevents the voltage of the power supply line 12 from exceeding the prescribed voltage. That is, the clamp circuit 25 prevents the voltage of the internal circuit 16 from applying more than the predetermined amount of voltage and can prevent the internal circuit 16 from being destroyed by an overload.

Figure 10:
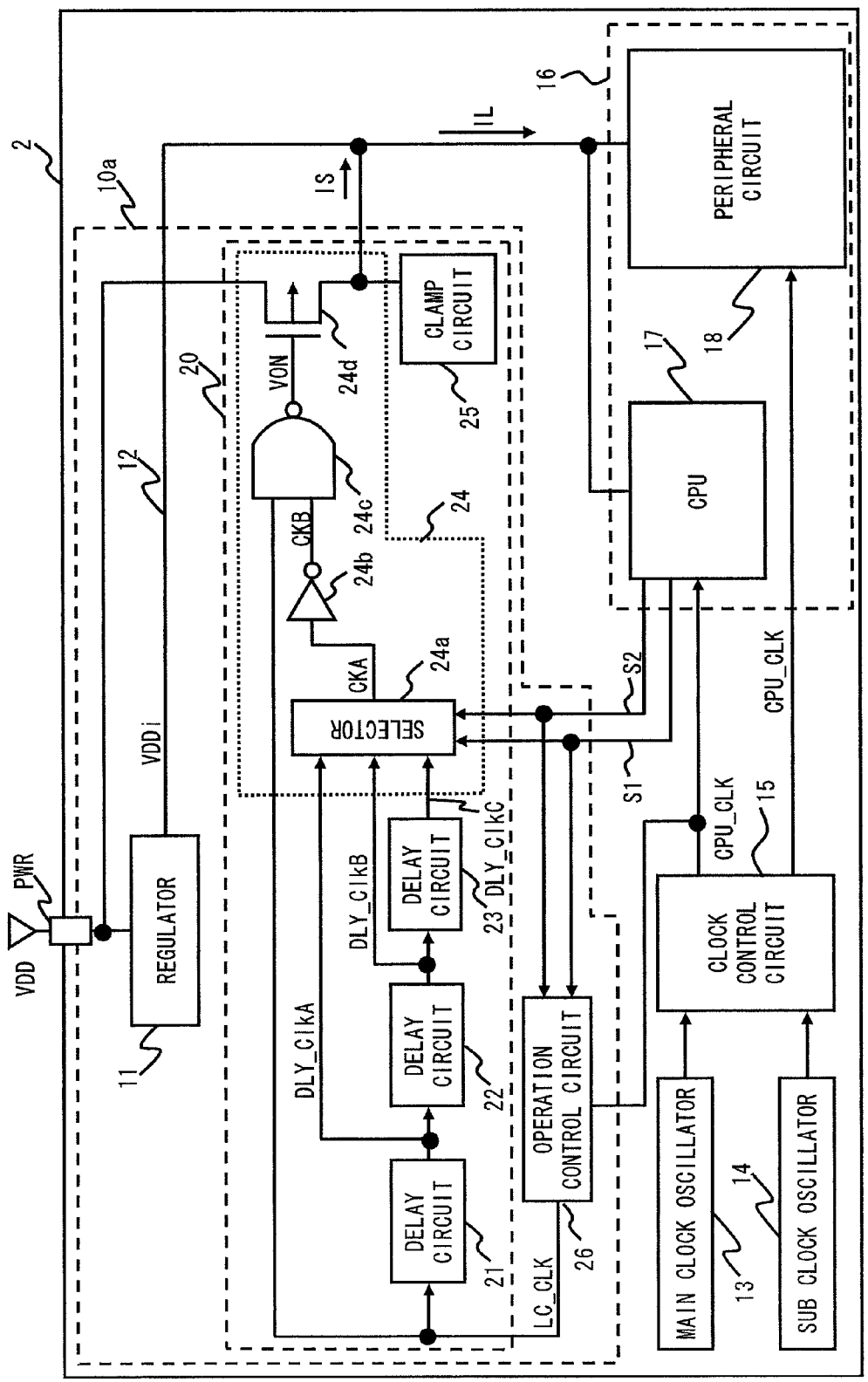
FIG. 10 is a block diagram showing a data processing device according to another exemplary embodiment.

FIG. 10 is a block diagram showing a data processing device 2 according to another exemplary embodiment of the present invention. As shown in FIG. 10, the data processing device 2 includes a power supply voltage generator 10a which includes an operation control circuit 26. In this exemplary embodiment the operation control circuit 26 controls the period during which power supply voltage variation suppressor 20 operates. The operation control circuit 26 controls the power supply voltage variation suppressor 20 so that it operates only during the prescribed period, starting from initiation of operation in the main RUN mode. More specifically, the operation control circuit 26 supplies the operation clock CPU_CLK to the power supply voltage variation suppressor 20 only during the period, where begins from initiation of operation in the main RUN mode. The operation control circuit 26 outputs as operation clock signal LC_CLK.

Figure 11:
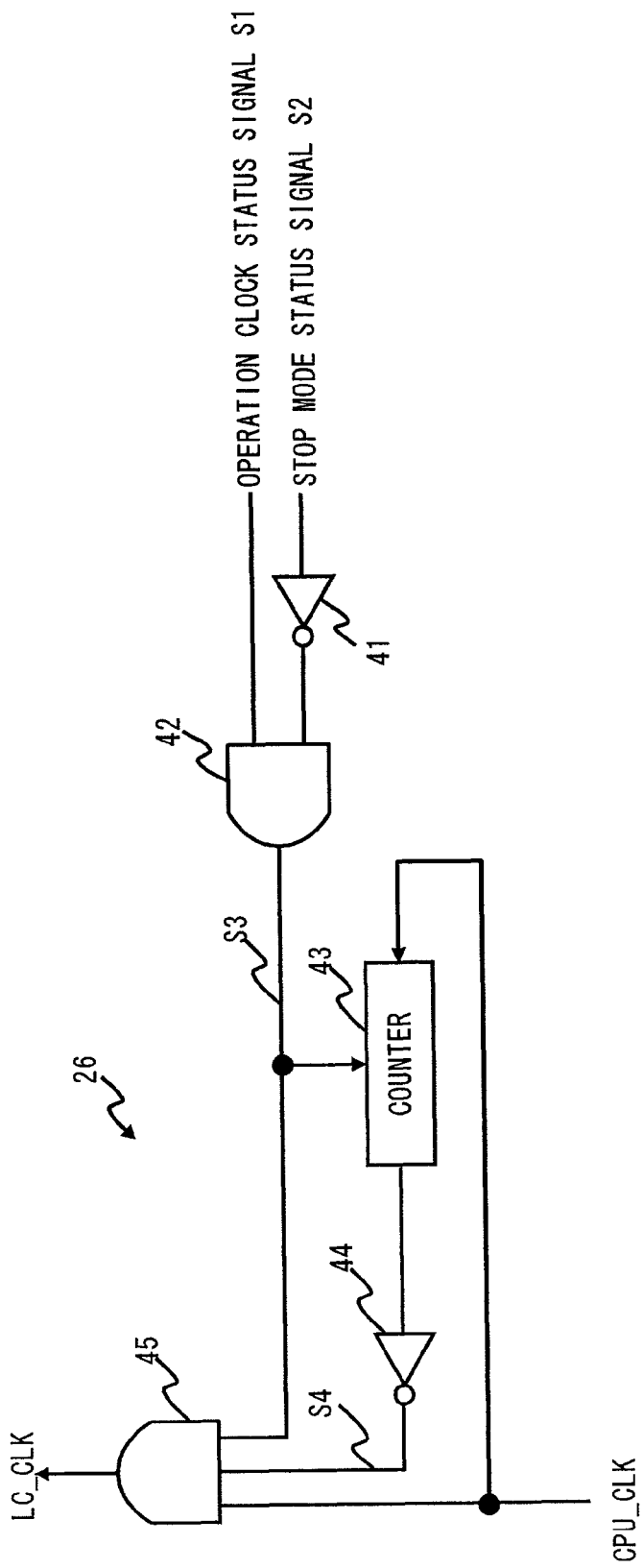
FIG. 11 is a block diagram showing an operation control circuit according to another exemplary embodiment.

In one exemplary embodiment operation clock status signal S1, operation clock status signal S2 and operation clock CPU_CLK are all input to the operation control circuit 26, which outputs a control clock LC_CLK during the prescribed period. The block diagram of an exemplary embodiment of the operation control circuit 26 is shown in FIG. 11. As shown in FIG. 11, the operation control circuit 26 includes inverters 41, 44, AND circuits 42, 45 and a counter 43.

The operation clock status signal S1 and the operation clock status signal S2, which is inverted by the inverter 41, are input into the AND circuit 42. The AND circuit 42 outputs the logical sum of the two signals as a start stop signal S3. The counter 43 counts the operation clock CPU_CLK by using the rising edge of the start stop signal S3 as a start signal. The counter 43 sets the level of the output signal low until the count value reaches a prescribed value, and then sets the level of the output signal high during the other period. The output signal of the counter 43 is inverted by inverter 44 to become an operation enable signal S4. The start stop signal S3, the operation enable signal S4 and the operation signal CPU_CLK are input into the AND circuit 45. Next, the AND circuit 45 outputs the control clock LC_CLK during the period in which the level of the start stop signal S3 and the operation enable signal S4 is high. That is, the AND circuit 45 operates a gate circuit of the operation control circuit 26.

Figure 12:
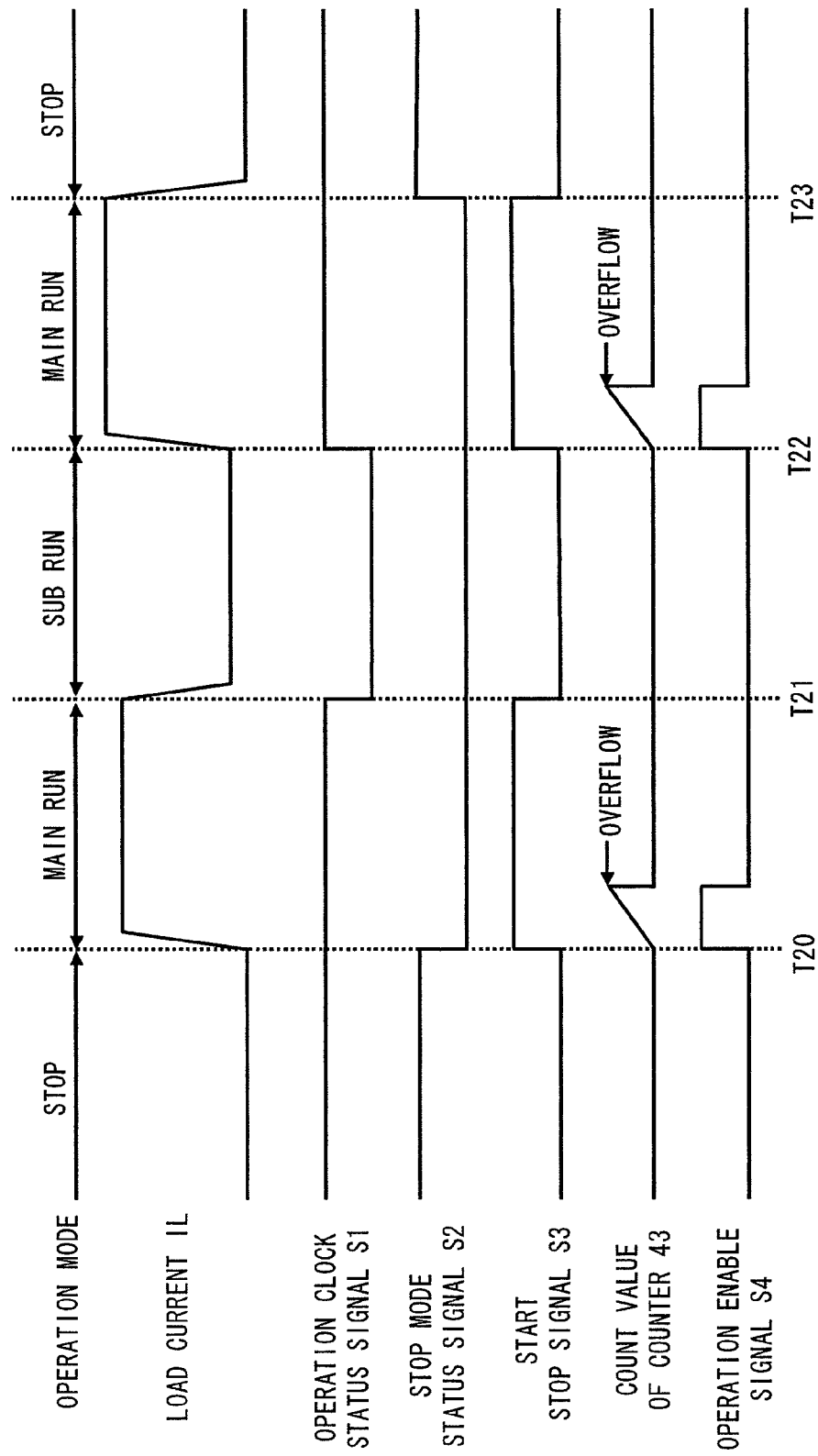
FIG. 12 is a timing chart showing the operation control circuit according to an exemplary embodiment.

An example of the operation of the operation control circuit 26 will be described with reference to a timing chart shown in FIG. 12. As shown in FIG. 12, the level of the start stop signal S3 becomes high only during the main RUN mode, and is dependent on the logical levels of the operation clock status signal S1 and the operation clock status signal S2 (timing T20-T21, and timing T22-T23). The counter 43 begins counts the operation clock signal CPU_CLK each time the circuit operates in main RUN mode. Then the level of the operation enable signal S4 changes from high to low, depending on the counter 43. In other words, when the count value of the counter 43 reaches the overflow state (the state in which the count value exceeds the prescribed value), the output level of the counter 43 changes from high to low. That is, the high level period of the operation enable signal S4 is included in the high level period of the start stop signal S3. Therefore, the operation control circuit 26 outputs the control clock LC_CLK during the period in which the level of the operation enable signal S4 is high.

Figure 13:
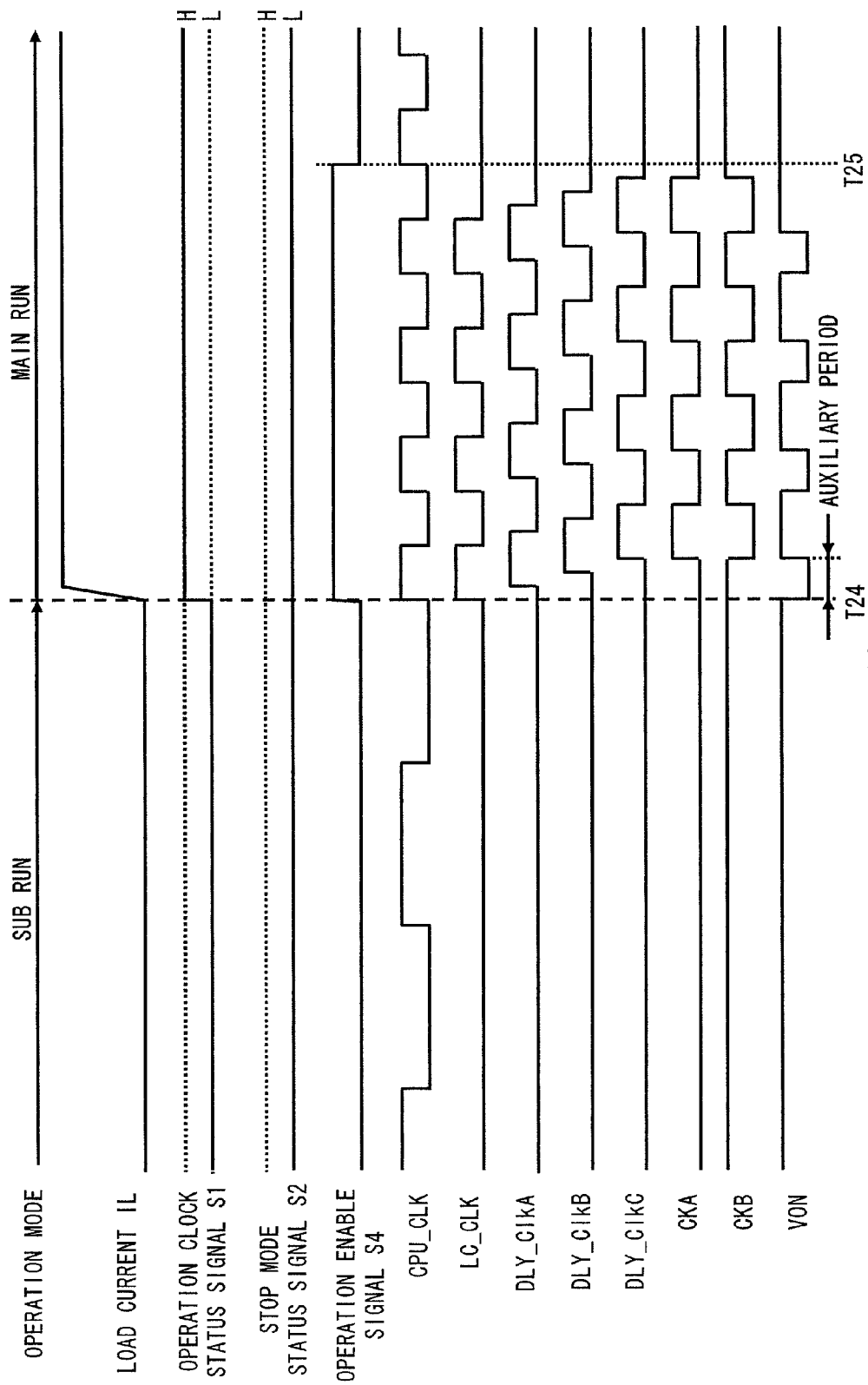
FIG. 13 is a timing chart showing an operation of the data processing device according to one exemplary embodiment.
Figure 14:
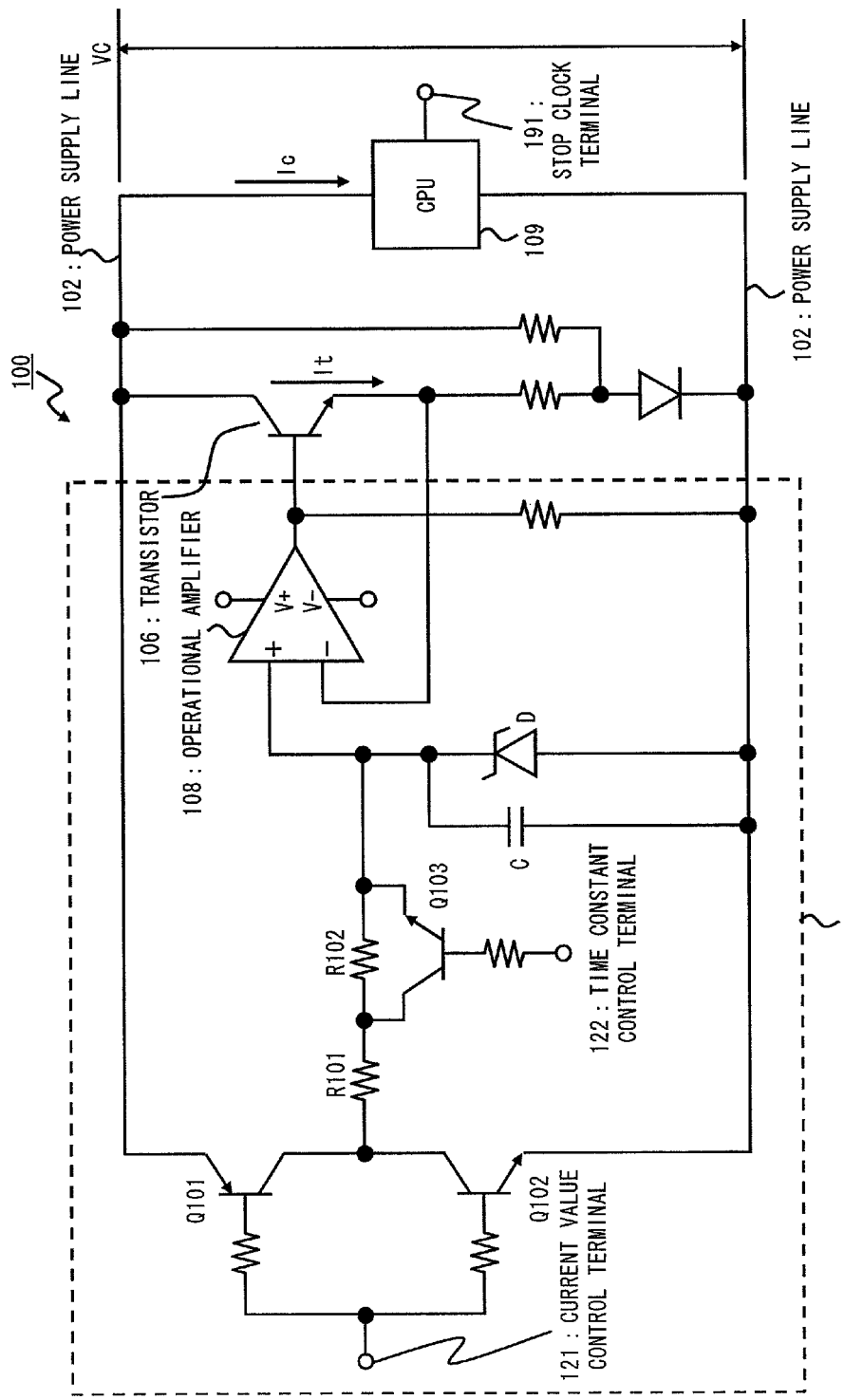
FIG. 14 is a block diagram showing a power voltage variation suppressor of the related art.
Figure 15:
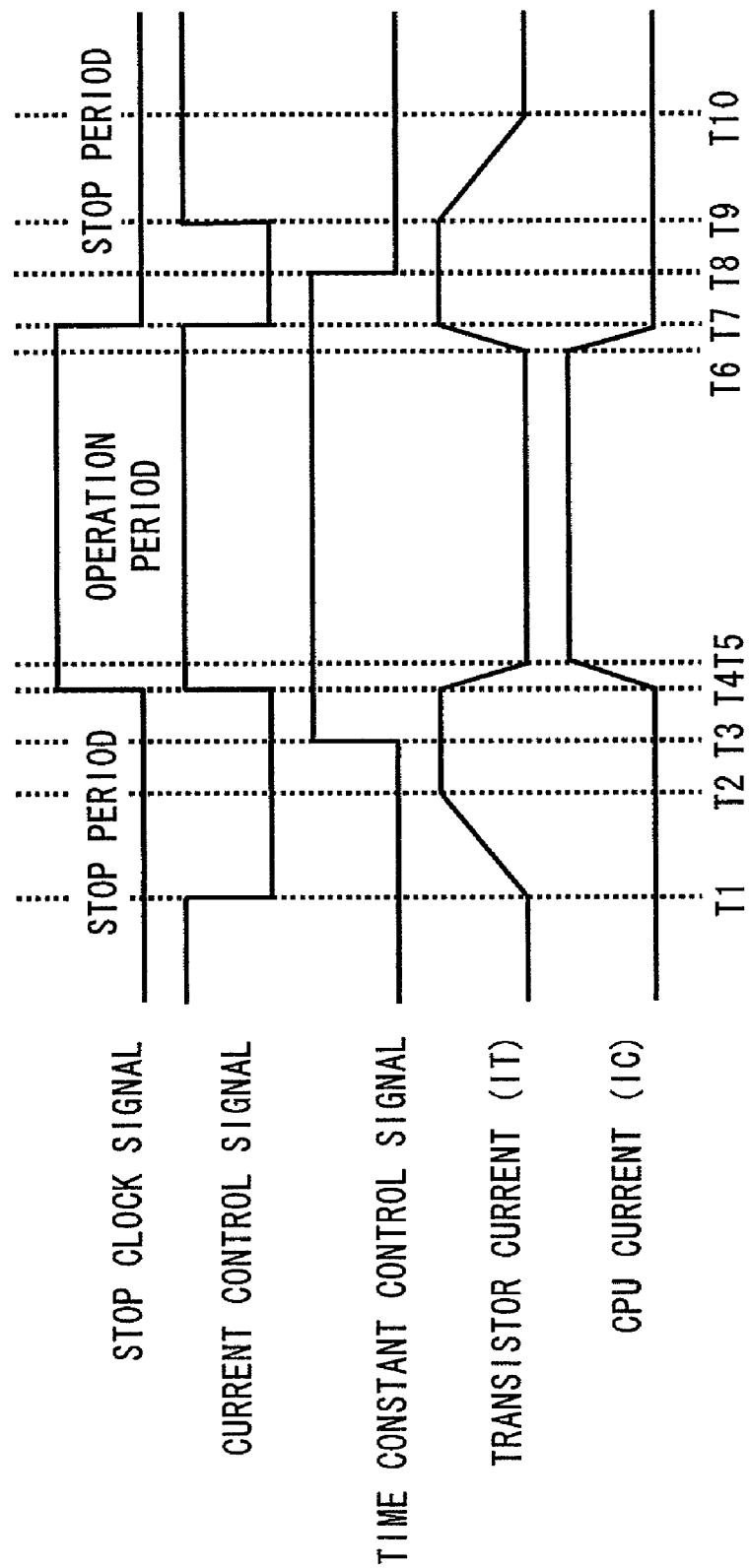
FIG. 15 is a timing chart showing an operation of the power voltage variation suppressor of the related art.
Figure 16:
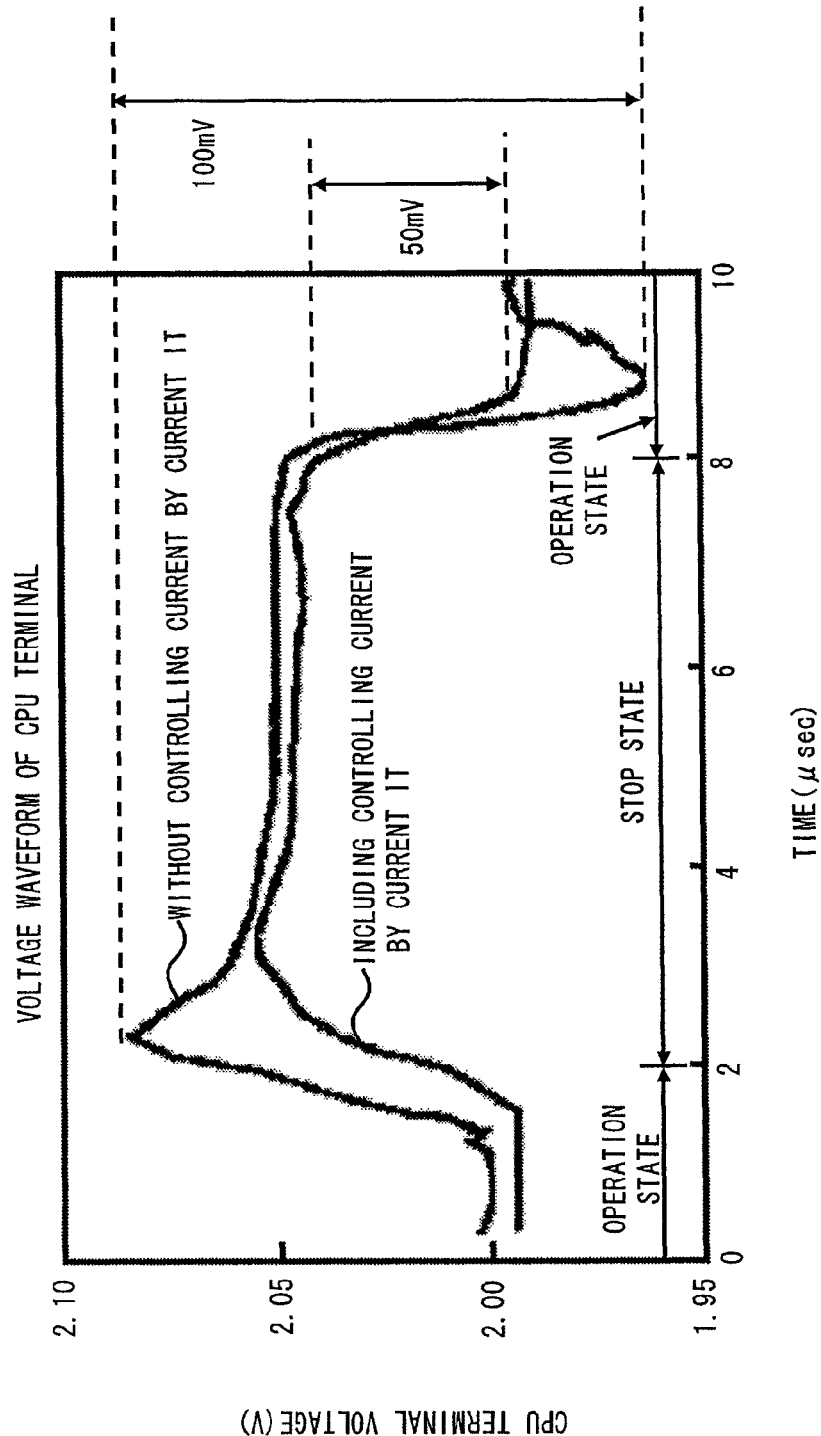
FIG. 16 is a voltage waveform of a CPU terminal in power voltage variation suppressor of the related art.
Figure 17:
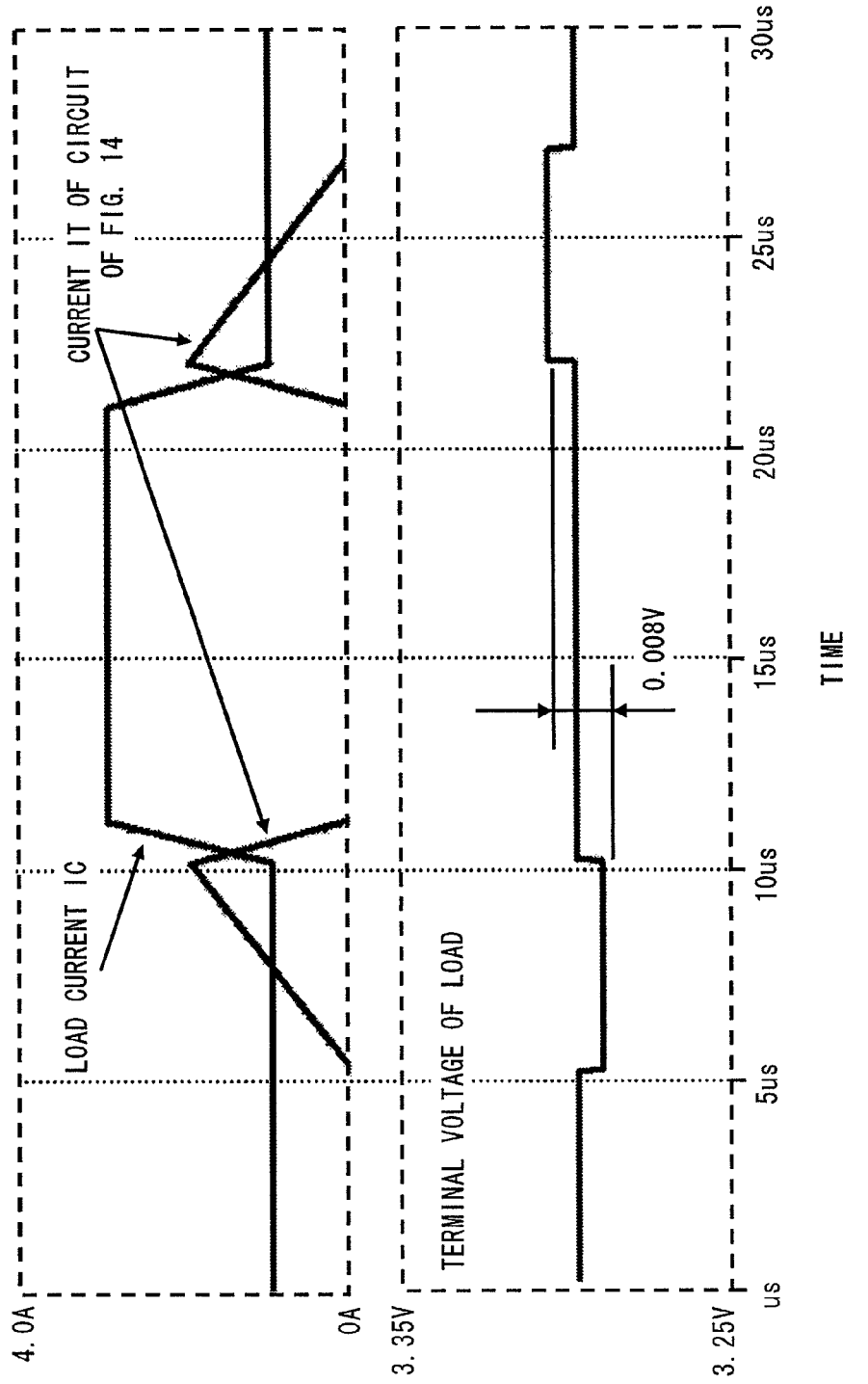
FIG. 17 is a diagram illustrating one problem of the power voltage variation suppressor of the related art.

Next, the operation of an exemplary embodiment of the data processing device 2, considering the operation of the operation control circuit 26, will be described with reference to timing chart of FIG. 13. FIG. 13 shows an example of an operation in which the stop mode is switched to the main RUN mode. Further, the counter 43 will overflow by counting four operation clocks CPU_CLK.

As shown in FIG. 13, the data processing device 2 puts the operation enable signal S4 into a high level, until the fifth operation clock CPU_CLK is input from the period in which the operation mode becomes the main RUN mode (time T24-T25). The control clock LC_CLK is output only during the period in which the level of the operation enable signal S4 is high. Therefore, the power supply voltage variation suppressor 20 generates the switch control signal VON, which has a low level, during the period between T24-T25. That is, the power supply voltage variation suppressor 20 outputs the auxiliary current IS only during the period between T24-T25.

As described above, in the data processing device 2 according to one exemplary embodiment, the power supply voltage variation suppressor 20 outputs the auxiliary current IS, using the operation control circuit 26, during a prescribed period which begins from the start of the main RUN mode. In the data processing device 2, the load current IL in the main RUN mode is much larger than that of the other modes, and large voltage drop of the second power supply voltage VDDi occurs at the operation starting point of the main RUN mode (timing T16-T18 shown in FIG. 9). By operating the power supply voltage variation suppressor 20 during a period in which the voltage of the second power supply voltage VDDi decreases greatly, the data processing device 2 prevents the voltage of the second power supply voltage VDDi from decreasing too much.

It is apparent that the present invention is not limited to the above exemplary embodiments, but may be modified and changed without departing from the scope and spirit of the invention. For example, in the case where the load current IL of the internal circuit 16 becomes large at the rising edge of the operation clock CPU_CLK, the auxiliary period can be synchronized with the falling edge of the operation clock CPU_CLK. Further, circuit configuration of the auxiliary current supply circuit can change arbitrarily, and is not limited to the above exemplary embodiments. For example, the switching transistor can consist of a NMOS transistor. Furthermore, in the above embodiments, although the selector 24a selects the delay clock DLY_ClkA and the delay clock DLY_ClkC, the mode in which the selector 24a selects the delay clock DLY_Clk B according to the size of the load current IS can also be set. Also, the description of the exemplary embodiments of the present invention is intended to be illustrative, and not to limit the scope of the claims, and many alternatives, modifications, and variations will be apparent to those skilled in the art.

What is claimed is:

1. A data processing device comprising:
a power supply terminal having a first power supply voltage applied thereto;
regulator that generates a second power supply voltage based on the first power supply voltage;
an internal circuit having an operation clock, wherein the second power supply voltage is supplied to the internal circuit through a power supply line, and the internal circuit operates in synchronization with the operation clock; and
a power supply voltage variation suppressor connected between the power supply terminal and the power supply line,
wherein the power supply voltage variation suppressor comprises at least two delay circuits that output delay clocks having different phases from each other, selects one of the delay clocks based on an operation mode of the internal circuit, sets an auxiliary period and supplies auxiliary current to the power supply line during the auxiliary period, and wherein the auxiliary period is synchronized with the operation clock of the internal circuit.

2. The data processing device according to claim 1, wherein the power supply voltage variation suppressor changes the auxiliary period based on an operation mode of the internal circuit.

3. The data processing device according to claim 1, wherein the internal circuit outputs the operation information signal, indicative of an operation mode of the internal circuit, to the power supply voltage variation suppressor and the power supply voltage variation suppressor changes the auxiliary period depending on the operation information signal, wherein the auxiliary current is output during the auxiliary period.

4. The data processing device according to claim 1, wherein the power supply voltage variation suppressor comprises:
an auxiliary current supplier to select the auxiliary period based on a delay time between the operation clock and the selected delay clock.

5. The data processing device according to claim 4 wherein the auxiliary current supplier selects the selected delay clock and supplies the auxiliary current to the power supply line from the power supply terminal during the auxiliary period.

6. The data processing device according to claim 1, further comprises a clamp circuit, the clamp circuit being connected to a connection node between an output of the power supply voltage variation suppressor and the power supply line, and prevents a voltage of the power supply line from increasing.

7. The data processing device according to claim 1, further comprising an operation control circuit to supply the operation clock to the power supply voltage variation suppressor during a period that begins from a switch in the operation mode of the internal circuit.

8. The data processing device according to claim 7, wherein the operation control circuit includes a counter to count numbers of the operation clock from the switching time of the operation mode of the internal circuit, and a gate circuit controlling output of the operation clock based on the counter.

9. The data processing device of claim 1, wherein the internal circuit receives an external signal that sets an operation mode of the internal circuit.

10. The data processing device of claim 1 further comprising:
an oscillator that generates the operation clock.

11. A data processing device comprising:
a power supply terminal having a first power supply voltage applied thereto;
a regulator that generates a second power voltage based on the first power voltage;
an internal circuit having an operation clock, wherein the second power supply voltage is supplied to the internal circuit through a power supply line, and the internal circuit operates in synchronization with the operation clock; and
a power supply voltage variation suppressor connected between the power supply terminal and the power supply line, wherein the power supply voltage variation suppressor comprises at least two delay circuits that output delay clocks having different phases from each other, selects one of the delay clocks based on an operation mode of the internal circuit, sets an auxiliary period synchronized with the operation clock of the internal circuit and connects the power supply terminal to the power supply line during the auxiliary period.

12. The data processing device according to claim 11, wherein the power supply voltage variation suppressor comprising:
an auxiliary current supplier that selects the auxiliary period based on a delay time between the operation clock and the selected delay clock, and connects the power supply terminal to the power supply line during the auxiliary period.

13. The data processing device according to claim 12 wherein the auxiliary current supplier selects the selected delay clock and supplies the auxiliary current to the power supply line from the power supply terminal during the auxiliary period.

14. The data processing device according to claim 12, wherein the auxiliary current supplier includes a switch transistor connected between the power supply terminal and the power supply line, and wherein the auxiliary current supplier controls a switch condition of the switching transistor and supplies an auxiliary current from the power supply terminal to the power supply line based on the switch condition.

15. The data processing device according to claim 14, wherein the operation control circuit includes a counter to count numbers of the operation clock from the switching time of the operation mode of the internal circuit, and a gate circuit controlling output of the operation clock based on the counter.

16. The data processing device according to claim 11, further comprising an operation control circuit to supply the operation clock to the power supply voltage variation suppressor during a period that begins from a switch in the operation mode of the internal circuit.

17. The data processing device of claim 11, wherein the internal circuit receives an external signal that sets an operation mode of the internal circuit.

18. The data processing device of claim 11 further comprising:
an oscillator that generates the operation clock.

19. A power supply voltage generator that generates a second power supply voltage and supplies the second power supply voltage to an internal circuit based on a first power supply voltage, comprising:
a power supply terminal, having the first power supply voltage applied thereto;
a regulator that generates the second power supply voltage based on the first power supply voltage;
a power supply line that supplies the second power supply voltage to the internal circuit; and
a power supply voltage variation suppressor connected between the power supply terminal and the power supply line, wherein the power supply voltage variation suppressor
comprises at least two delay circuits that output delay clocks having different phases from each other, selects one of the delay clocks based on an operation mode of the internal circuit, sets an auxiliary period synchronized with an operation clock of the internal circuit with which the internal circuit operates in synchronization, and supplies auxiliary current to the power supply line during the auxiliary period.

20. The power supply voltage generator according to claim 19, wherein the power supply voltage variation suppressor changes the auxiliary period based on the operation mode of the internal circuit.

21. The power supply voltage generator according to claim 19 wherein the internal circuit outputs an operation information signal, indicative of the operation mode of the internal circuit, to the power supply voltage variation suppressor and the power supply voltage variation suppressor changes the auxiliary period depending on the operation information signal, wherein the power supply voltage variation suppressor outputs the auxiliary current during the auxiliary period.

22. The power supply voltage generator according to claim 19, further comprising an operation control circuit, the operation control circuit supplies the operation clock to the power supply voltage variation suppressor during a period that begins from a switch in an operation mode of the internal circuit.

23. A method for controlling a power supply voltage of an internal circuit, comprising:
generating a second power supply voltage based on a first power supply voltage;
supplying the second power voltage to the internal circuit through a power supply line, wherein the inter clock operates in synchronization with an operation clock;

generating at least two output delay clocks having different phases from each other, selecting one of the delay clocks based on an operation mode of the internal circuit, setting an auxiliary period that is synchronized with an operation clock of the internal circuit with which the internal circuit operates in synchronization; and supplying auxiliary current to the power supply line during the auxiliary period.

24. The method for controlling power supply voltage according to claim 23 wherein the auxiliary period is determined based on an operating mode of the internal circuit.

* * * * *